Dec. 31, 1968     J. SCOLA     3,419,245

TUBE CLAMP

Filed Nov. 29, 1965

INVENTOR.
JOSEPH SCOLA
BY
*Salter & Michaelson*
ATTORNEYS

United States Patent Office 3,419,245
Patented Dec. 31, 1968

3,419,245
TUBE CLAMP
Joseph Scola, Providence, R.I., assignor to Vargas Manufacturing Co., Providence, R.I., a corporation of Rhode Island
Filed Nov. 29, 1965, Ser. No. 528,318
3 Claims. (Cl. 251—10)

ABSTRACT OF THE DISCLOSURE

A clamp for use with a flexible tube defined by a one-piece member that is mounted on the tube and that includes a base portion, to one end of which a clamping element is joined in pivotal relation and to the other end of which a locking portion is joined, the locking portion having a first opening formed therein that recevies a tongue formed on the end of the clamping element, the tongue being held in position by engagement thereof with a shoulder that is formed on the locking portion by the first opening and a reduced opening communicating therewith, an extension being joined to the tongue and being receivable in said reduced opening when a second clamping position of the clamping element is required.

---

The present invention relates to a clamp for use with flexible tubing. More particularly, the present invention relates to a clamp that is adapted to be mounted on a flexible tube and that is movable to a locking position on said tube for effectively restricting flow of fluid therethrough.

A first object of the present invention is to provide a spring clamp for use with a flexible tube that is adapted to be movable from an open to a locking position on the tube by pivotally moving a clamping element in engagement with a locking portion.

Another object of the invention is to provide a tube clamp that includes means for adjusting the clamping action thereof in accordance with the size of the tube on which the clamp is mounted.

Still another object is to provide a tube clamp in which the clamping action of the clamp is effectively increased by the use of special crimps in the material from which the clamp is constructed.

Still another object is to provide a clamp for use with tubing wherein the clamping member of the clamp is adjustably clamped to a locking portion in accordance with the diameter of the tube to be clamped.

Other objects, features and advantages of the invention will become apparent as the description thereof proceeds when considered in connection with the accompanying illustrative drawings.

In the drawings which illustrate the best mode presently contemplated for carrying out the present invention:

Figure 1:
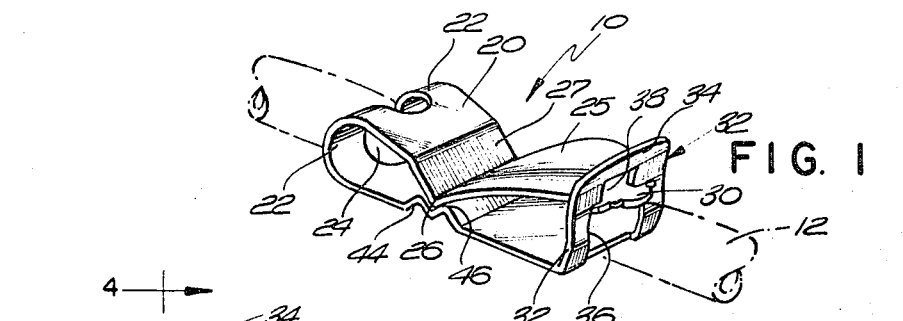
FIG. 1 is a perspective view of the tube clamp embodied in the present invention showing the clamp in a clamping position and as mounted on a flexible tube.
Figure 2:
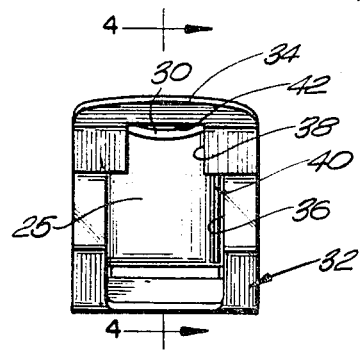
FIG. 2 is an end elevational view of the tube clamp illustrated in FIG. 1.
Figure 3:
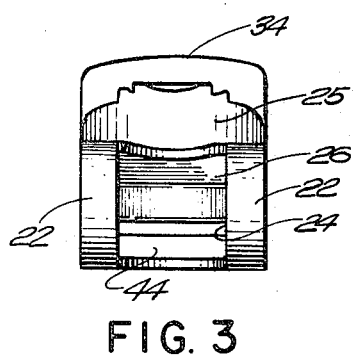
FIG. 3 is an end elevational view opposite to that illustrated in FIG. 2.
Figure 4:
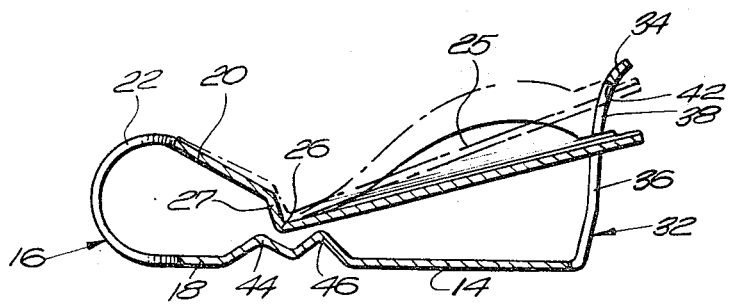
FIG. 4 is a sectional view taken along lines 4—4 in FIG. 2, the adjustable position of the clamp being shown in dotted lines.
Figure 5:
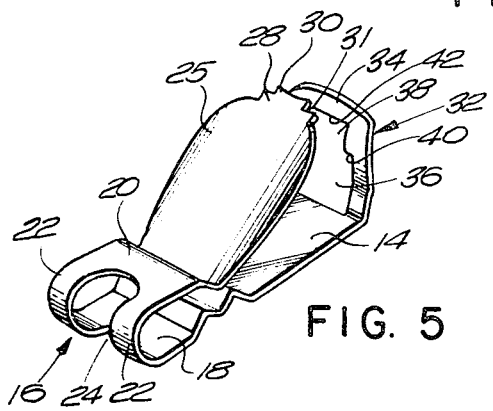
FIG. 5 is a perspective view of the tube clamp with the clamping element illustrated in the open position thereof.

Referring now to the drawing and particularly to FIG. 1, the tube clamp of the present invention is illustrated and is generally indicated at 10. As shown, the tube clamp 10 is adapted to be mounted on a flexible tubing indicated in dotted lines at 12, and as will hereinafter be described, the tube clamp 10 is adapted to close off flow of a liquid through the tube 12 by collapsing the walls thereof in the usual manner. In this connection, the tube clamp 10 may be employed with flexible tubing that is secured to fluid-containing bags, such as hot water bottles, enema bags, etc. As shown in FIGS. 1, 4 and 5, the tube clamp 10 is formed in a one-piece construction and is normally fabricated of a spring metal material. However, it is understood that other materials may be utilized in the manufacture of the tube clamp 10 without departing from the spirit of the invention.

The fabrication of the tube clamp 10 is accomplished by stamping it out from the metal material and then bending it to the required shape and configuration. As shown, this shape and configuration includes a base portion 14 to one end of which a spring portion generally indicated at 16 is joined. The spring portion 16 includes a lower wall 18 and an upper wall 20 that are interconnected by curved, spaced legs 22 that define an opening 24 therebetween. The spring portion 16 which is bent on itself is integrally joined to a clamping element 25 that is concave in configuration to accommodate the thumb of the user. The clamping element 25 terminates at the rear end thereof in an elbow indicated at 26, the elbow 26 being joined to the wall 20 of the bent spring portion 16 through a shortened section 27. The outermost end of the clamping element 25 is formed with a reduced tongue 28 on the outer edge of which a further reduced extension 30 is formed, the junction of the reduced extension 30 and tongue 28 defining a shoulder 31.

Joined to the other end of the base portion 14 and extending upwardly therefrom at generally right angles with respect thereto is a locking portion 32. Since the material from which the clamp 10 is fabricated is spring metal, the locking portion 32 is somewhat flexible in use and has limited deflecting movement at the junction thereof with the base portion 14. The uppermost end of the locking portion indicated at 34 is curved outwardly and, as will be described, is formed in this manner to facilitate deflecting of the locking portion 32 when the clamping element 25 is to be released from locking engagement therewith. In order to receive the tubing 12 therein, the locking portion 32 is formed with an opening 36 that is axially aligned with the opening 24 formed in the end portion 16. As shown in FIG. 1, the tubing 12 projects through the opening 16 and opening 36 and is disposed between the clamping element 25 and the base portion 14. The clamp 10 is thus mounted on the tube 12 for clamping engagement therewith. Also formed in the locking portion 32 and communicating with the opening 36 is a reduced opening 38 that defines a shoulder 40 therewith. The upper edge of the reduced opening 38 indicated at 42 defines a bearing edge, the purpose of which will be described hereinafter.

In the normal clamping position of the tube clamp 12, the reduced extension 30 of the clamping element 25 is adapted to extend into the reduced opening 38 and engages the bearing edge 42 that is formed as part of the opening 38, wherein the clamping element 25 is secured to the locking member 32. In this position, the elbow 26 which is formed as part of the clamping element 25 is moved toward the base portion 14 for collapsing the wall of the tubing 12 therebetween. As the wall of the tubing 12 is squeezed by the elbow 26, flow of a liquid therethrough is closed off. Referring now to FIG.

4, it is seen that the base portion 14 is formed with crimped portions that define upwardly extending, spaced projections 44 and 46 that receive the elbow 26 therebetween and that cooperate with the elbow 26 for more effectively collapsing the wall of the tubing 12 for preventing flow of fluid therethrough when the clamping element 25 is located in the locked position thereof.

On occasion, it may be desirable to mount the clamp 10 on a tubing having a diameter somewhat reduced in size with respect to the diameter of the tubing that is clamped by location of the reduced extension 30 in the opening 38. When a smaller diameter tube is used in connection with the clamp 10, it is necessary in this instance to locate the elbow 26 in closer relation with respect to the projections 44 and 46 than that previously described. For this purpose, the clamping element 25 is provided with the reduced tongue 28, the tongue 28 being receivable within the opening 36 in the locking portion 32. As the clamping element 25 is moved toward the base portion 14 upon further pressure by the user on the clamping element, the shoulder 31 urges the locking portion outwardly in pivotal relation until the tongue 28 snaps beneath the shoulder 40. In this position, the tongue 28 and extension 30 projects through the opening 36, the spring action of the depressed clamping element 25 causing the clamping element to be positively locked as the tongue 28 engages the shoulder 40. The elbow 26 is thus moved into closer relation to the projections 44 and 46 for effectively clamping off flow in the smaller diameter tubing.

It is seen that when the tube clamp 10 is mounted on the tubing 12, the clamping element 25 may be located in the clamping position by merely exerting pressure on the concave portion of the clamping member to locate the extension 30 within the opening 38. The elbow 26 then cooperates with the projections 44 and 46 to collapse the wall of the tubing 12 to effectively close off flow of fluid through the tubing, as shown in dotted lines in FIG. 4. If a further clamping action is required, or if a smaller diameter tube is used, further movement of the clamping element 25 downwardly will force the reduced tongue 28 to engage the shoulder 40. This will lock the clamping member in the lower position thereof as shown in full lines in FIG. 4. Release of the clamping element 25 from the clamped position is effected by the user exerting an outward force on the upper end 34 of the locking member 32. The locking member is thus deflected outwardly sufficiently to release the tongue 28 and reduce extension 30 from engagement with the locking member 32.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a clamp for a flexible tube, a one-piece member adapted to be mounted on said tube and including a base portion, to one end of which a clamping element is joined in pivotal relation, the tube being adapted to be received between said base portion and clamping element for being clamped therebetween, a locking portion joined to the other end of said base portion and being engageable with said clamping element, means formed on the outer end of said clamping element for engaging said locking portion to lock said clamping portion in clamping relation thereon, wherein a clamping action is exerted on said tube so that flow of a fluid therethrough is shut off, and means formed on said locking portion that cooperates with said engaging means on the outer end of said clamping element for adjusting the locking position of said clamping element to compensate for the clamping of different diameter tubes by said clamp, said engaging means including a tongue on the outer end of which a reduced extension is formed, said locking portion having an opening formed therein for receiving said tongue for locating said clamping element in a clamping position, said adjusting means on said locking portion being defined by a reduced opening communicating with the opening in said locking portion that receives said reduced extension therein, wherein location of the tongue in the opening in said locking portion defines a first clamping position of said clamping element, and location of the reduced extension in said reduced opening defines a second clamping position of said clamping element, the junction of said first opening with the reduced opening defining a first shoulder, and the junction of said extension with said tongue defining a second shoulder, said extension engaging the upper edge of said reduced opening when the clamping element is located in the second clamping position, said second shoulder urging said locking portion outwardly when downward force is exerted on the clamping element for moving said clamping element to the first clamping position, said tongue engaging said first shoulder in the first clamping position.

2. In a clamp for a flexible tube, a one-piece member adapted to be mounted on said tube and including a base portion, to one end of which a clamping element is joined in pivotal relation, said clamping element including a downwardly projection portion, the tube being receivable between said base portion and the downwardly projecting portion of said clamping element for being clamped therebetween, a locking portion joined to the other end of said base portion and being engageable with said clamping element, means formed on the outer end of said clamping element for engaging said locking portion to lock said clamping element in clamping relation thereon, wherein a clamping action is exerted on said tube to restrict flow of a fluid therethrough, and spaced projections formed on said base portion that are located in opposed relation to the downwardly projecting portion of said clamping element and cooperating therewith for producing a tight clamping action on said tube when said clamping element is located in the clamping position thereof, means formed on said locking portion that cooperates with said engaging means on the outer end of said clamping element for adjusting the locking position of said clamping element, said engaging means including a tongue, the outer end of which is reduced to define an extension, said locking portion having an opening formed therein for receiving said tongue for locating said clamping element in a first clamping position, said means for adjusting the locking position of said clamping element including a reduced opening formed in said locking portion and communicating with the first-named opening and being adapted to receive said extension therein, location of said extension in said reduced opening defining a second clamping position, the junction of said first opening with the reduced opening defining a first shoulder, and the junction of said extension with said tongue defining a second shoulder, said extension engaging the upper edge of said reduced opening when the clamping element is located in the second clamping position, said second shoulder urging said locking portion outwardly when downward force is exerted on the clamping element for moving said clamping element to said first clamping position, said tongue engaging said first shoulder in the first clamping position.

3. In a clamp for a flexible tube, a one-piece member adapted to be mounted on said tube and including a base portion, to one end of which a clamping element is joined in pivotal relation, the tube being receivable between said base portion and clamping element for being clamped therebetween, a locking portion joined to the other end of said base portion and being engageable with said clamping element, said locking portion having a first opening formed therein that occupies a substantial portion thereof, a second reduced opening communicating with said first opening and defining a first shoulder therewith, and a tongue formed on the outer end of said clamping element, said tongue having a reduced extension joined thereto that cooperates with said tongue to define a second shoulder, said tongue being receivable in said first opening for engagement with said first shoulder to define a first clamping position, and said extension being receivable in said reduced opening such that said extension engages an upper edge of said reduced opening to define a second clamping position, and said second shoulder urging said locking portion outwardly when downward force is exerted on said clamping element for moving said clamping element from the second to first clamping position.

References Cited

UNITED STATES PATENTS

| | | | |
|---|---|---|---|
| 350,850 | 10/1886 | Tatum | 251—10 |
| 820,216 | 5/1906 | Leffingwell et al. | 251—10 |
| 823,068 | 6/1906 | Mosley | 251—10 |
| 827,640 | 7/1906 | Jessup | 251—10 |
| 1,361,770 | 12/1920 | O'Connor | 251—10 |

WILLIAM F. O'DEA, *Primary Examiner.*

R. GERARD, *Assistant Examiner.*